United States Patent
Shigeki et al.

(10) Patent No.: US 6,928,532 B2
(45) Date of Patent: Aug. 9, 2005

(54) LOGIC INTEGRATED CIRCUIT, AND RECORDING MEDIUM READABLE BY A COMPUTER, WHICH STORES A SOURCE OF CPU CORE ON SAID LOGIC INTEGRATED CIRCUIT

(75) Inventors: Kenji Shigeki, Nara (JP); Ryohei Tanaka, Takarazuka (JP); Toshimitsu Nakao, Takarazuka (JP)

(73) Assignees: Roran Co., Osaka (JP); Daihen Corporation, Osaka (JP)

( * ) Notice: Subject to any disclaimer, the term of this patent is extended or adjusted under 35 U.S.C. 154(b) by 795 days.

(21) Appl. No.: 09/772,027

(22) Filed: Jan. 29, 2001

(65) Prior Publication Data

US 2001/0011345 A1 Aug. 2, 2001

(30) Foreign Application Priority Data

Jan. 28, 2000 (JP) ...................................... 2000-024826

(51) Int. Cl.$^7$ ................................................ G06F 9/00
(52) U.S. Cl. ........................................ 712/37; 712/200
(58) Field of Search ................................... 712/37, 200

(56) References Cited

U.S. PATENT DOCUMENTS 5,574,930 A * 11/1996 Halverson et al. ............ 712/34
6,704,816 B1 * 3/2004 Burke ........................ 710/100

FOREIGN PATENT DOCUMENTS

| EP | 0 926 589 | 6/1999 |
|----|-----------|--------|
| JP | 09-282163 | 10/1997 |
| WO | 91 11765 | 8/1991 |

OTHER PUBLICATIONS

Sep. 28, 1993 A High–Speed RISC CPU Using the QL16×24 FPGA Bruce Kleinman et al. WESCON/'93. Conference Record, San Francisco, CA, USA pp. 245–250.

Jan. 1, 1989 VLSI RISC architecture and organisation Furber, S.B. Marcel Dekker Inc., New York, US, XP002266554 pp. 238–239.

May 10, 1988 Optimized for Performance and Cost/Performance: The AM29000 Family Chu, Paul Electro, Electronic Conventions Management, Los Angeles; US, XP000118801 vol. 13 pp. 42–44, 1–7.

* cited by examiner

Primary Examiner—William M. Treat
(74) Attorney, Agent, or Firm—Jordan and Hamburg LLP (57) ABSTRACT

In a logic integrated circuit such as an FPGA, a controller reads in an instruction, and then directly transmits ON/OFF information for each of bits composing microcode included in the instruction, to registers and data memories that are allocated to each of the bits through control lines, to thereby control the registers and data memories. Thus, processing executed by the controller is simplified in this construction. This allows makings the controller having a simple structure, thereby making it possible to construct a simple CPU core on the logic integrated circuit such as the FPGA, decreasing a space of analytic logic, and eliminating necessity for re-integrating a hardware circuit every time the logic is renewed.

10 Claims, 11 Drawing Sheets

FIG.6 PRIOR ART
EXAMPLE OF CONTROL IN SINGLE CLOCK (IN LDA & STA CONTINUOUS COMMAND)

FIG.7  EXAMPLE OF SOLUTION BY INSERTING NOP

LOGIC INTEGRATED CIRCUIT, AND RECORDING MEDIUM READABLE BY A COMPUTER, WHICH STORES A SOURCE OF CPU CORE ON SAID LOGIC INTEGRATED CIRCUIT

BACKGROUND OF THE INVENTION

This invention relates generally to a re-programmable logic integrated circuit, such as a field programmable gate array (hereinafter referred to as FPGA), a programmable logic device (hereinafter referred to as PLD), which is integrated in a factory automation (FA) device, a communication device, a household electrical appliance, and so forth. Particularly, this invention relates to an art for constructing a CPU core on the logic integrated circuit.

As to a logic integrated circuit such as a conventional FPGA, PLD, wherein a user completes functions by themselves, in the case of constructing a complicated analytic logic, there has been adopted a method of directly describing analytic logic in a hardware description language, and creating a hardware circuit corresponding to said logic. Compared with this, in an ASIC (Application Specific IC) field, many kinds of circuits adopt a construction of a system LSI having a CPU core, and have adopted a processing method by using a program in the CPU for complicated analytic processing.

However, as to the FPGA or PLD wherein a hardware circuit corresponding to the above-mentioned conventional analytic logic is created, in the case of constructing the complicated analytic logic, the circuit increases its scale. Besides, in the case of constructing a circuit having a logic in which a protocol is frequently renewed, the hardware circuit has to be rearranged every time the logic is renewed. Further, in the case of directly integrating the CPU core employed in said conventional ASIC into the FPGA or PLD, a degree of using a gate increases, and an area of the CPU core on the FPGA or PLD also increases. Furthermore, since the CPU core used in the conventional ASIC is created without considering wiring delay characteristics inside the circuit, when integrated on the FPGA or PLD, the CPU core reduces its performance, and decreases its operational speed. Moreover, in the conventional CPU core, if a memory for storing programs or data on a three-stage pipeline construction is a complete synchronous memory, and when a load instruction from the memory to a register and a store instruction from the register to the memory are continuously carried out, a timing of reading out data from the memory to the register is late for a timing of writing in data from the register to memory, so that pipeline stall occurs, which causes a problem of decreasing processing speed.

SUMMARY OF THE INVENTION

This invention is made to solve the above-mentioned problems. The first object of the present invention is to construct a CPU core on a logic integrated circuit such as an FPGA or PLD, with a simple structure and high performance, to thereby provide a recording medium read by a computer, which records an FPGA or PLD with a source of the CPU core, that allows to reduce a space for analytic logic on the logic integrated circuit, and eliminates a need for rearranging a hardware circuit every time a logic is renewed.

The second object of the present invention is to provide a recording medium read by a computer, which records a logic integrated circuit capable of enhancing processing speed of a CPU core, and a source of said CPU core, by preventing pipeline stall even if a complete synchronous memory is adopted on a three-stage pipeline construction.

In order to achieve the above-mentioned objects, according to one aspect of the present invention, there is provided a logic integrated circuit such as a field programmable gate array having a CPU core: wherein the CPU core is provided with registers, memories and controller for the registers and memories; wherein the CPU core has instructions including microcode; and wherein the controller has control lines for outputting enable signals to the registers and memories, reads in the instruction, and transmits ON/OFF information for each of bits composing microcode included in the instruction to registers and memories allocated to each of the bits, thereby controlling the registers and memories through the directing control lines.

In this constitution, the controller controls conditions of registers and memories corresponding to each of bits with directly employing ON/OFF information for each of bits composing microcode included in the instruction without generating control signals for the registers and memories by decoding the instruction, thereby making it possible to simplify processing carried out by the controller. This allows making the controller having a simple structure.

According to another aspect of the present invention, the CPU core has address pointer registers in accessing the memories; the controller has control lines for giving either direction of increment and decrement to the address pointer registers, reads in the instructions, and transmits ON/OFF information for each of bits for giving either direction of increment and decrement to the address pointer registers in microcode included in the instruction through the directing control lines; and the address pointer registers counts up or counts down values of maintaining addresses when receiving ON information about the bits for giving either direction of increment and decrement from the controller through the directing control lines. Accessing the memory with repeatedly using the address pointer registers, makes it possible to efficiently process data in sequential address spaces on the memory.

According to a further aspect of the present invention, there is provided a logic integrated circuit such as a field programmable gate array having a CPU core: wherein the CPU core is provided with a program storing memory, a data storing memory, and a controller for controlling the memories and the entire CPU core; wherein the program storing memory and data storing memory are complete synchronous memories; and wherein the controller performs parallel processing in a three-stage pipeline construction, and uses a higher speed clock than normal clocks, thereby reading in data from the program storing memory and data storing memory.

In the above constitution, the controller reads in data from the program storing memory and data storing memory that are complete synchronous memories, thereby speeding up timing of reading in instructions or data that are stored in these memories as compared with the case of reading in these data by employing a normal clock. Owing to this constitution, even if an instruction of reading out data from the data storing memory to a register, and an instruction of writing data from the register in the data storing memory are sequentially carried out, the timing of reading out data from the data storing memory to the register is in time to timing of writing in data from a succeeding register to the data storing memory. This can prevent pipeline stall in spite of adopting complete synchronous memories in a three-stage pipeline construction.

According to a further aspect of the present invention, the CPU core is further provided with general-purpose registers, and a data transmitting path for connecting the general-purpose registers and memories only through multiplexers for inputting and outputting to and from the general-purpose registers without passing through multiplexers for inputting and outputting memory data, and wherein the CPU core inputs data from the memories to the general-purpose registers with using the data transmitting path. This makes it possible to input data from the memory to the general-purpose register only through a multiplexer for general-purpose registers without passing a multiplexer for inputting and outputting memory data, which allows high-speed processing of reading out data from the memory to the general-purpose register.

According to a further aspect of the present invention, the CPU core is further provided with general-purpose registers, and a data transmitting path for connecting the general-purpose registers and memories only through multiplexers for inputting and outputting to and from the general-purpose registers without passing through ALU, and wherein the CPU core outputs data to the memories with using the data transmitting path. This makes it possible to output data from the general-purpose register only through a multiplexer for inputting and outputting memory data without passing the ALU, which allows high-speed processing of writing in data from the general-purpose register to the memory.

According to a further aspect of the present invention, the CPU core comprises multiplexers including an integrated interface for inputting data from FIFO that is an accessible memory having data input and output units which are separated from each other, and wherein the CPU core has instructions for reading in data from the FIFO through the multiplexers. This makes it possible to easily read in the data from the FIFO into the CPU core by issuing an instruction of reading in the data from the FIFO.

According to a further aspect of the present invention, there is provided a recording medium which is capable of being read out by computers, and records a source as circuit information for composing a CPU core: wherein the source is described at hardware description language level for the CPU core on the logic integrated circuit.

DETAILED DESCRIPTION OF THE PREFERRED EMBODIMENT OF THE PRESENT INVENTION

Figure 1:
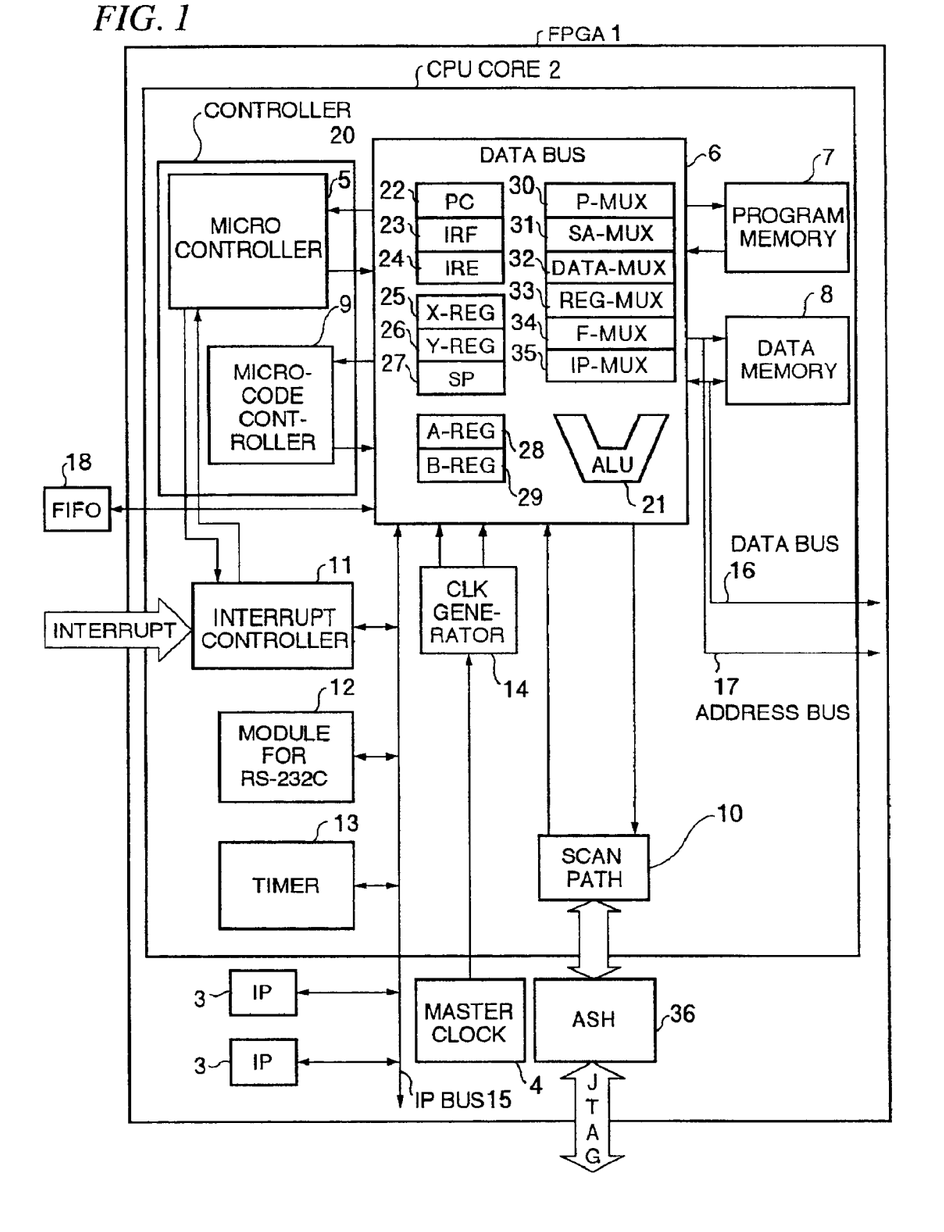
FIG. 1 is a view showing a structure around a CPU core on a logic integrated circuit according to one embodiment of the present invention.

Now, the explanation is given to a field programmable gate array (hereinafter referred to as FPGA), as a logic integrated circuit according to one embodiment of the present invention with reference to the drawings. FIG. 1 illustrates a structure around a CPU core of an FPGA according to the present embodiment. An FPGA 1 comprises a CPU core 2, IPs (Intellectual Properties) 3 such as reusable macro-cells or mega-cells, a master clock 4 and an ASH (Adaptive Scan Handler) 36, wherein the CPU core 2 is a simple RISC processor, and the ASH 36 controls flows of data or control signals in an actual the CPU core 2 test. The CPU core 2 is one kind of the IP, which is integrated for decreasing a scale of an analytic logic on the FPGA 1. The CPU core 2 also includes a micro controller 5, a data bus 6, a program memory 7, a data memory 8 and a microcode controller 9, wherein the micro controller 5 controls the entire CPU core 2 by decoding contents of instructions, the data bus 6 consists of various kinds of registers and multiplexers. The program memory 7 stores a program in which processing of the CPU core 2 is described. The data memory 8 memorizes data used by the CPU core 2. The microcode controller 9 controls the resisters and so forth based on microcode (code composed of bit information for controlling the registers and so forth). Further, the CPU core 2 is equipped with a scan path 10 for performing input/output of data in and from the registers and the like in the CPU core 2 based on control signals from the ASH 36. Furthermore, the CPU core 2 is provided with an interrupt controller 11, an RS-232C module 12, a timer 13 and a clock generator 14. The interrupt controller 11 detects interrupt signals generated inside or outside the FPGA 1, and acknowledges it to the micro controller 5. The RS-232C module 12 has an RS-232C interface for making communications inside the FPGA 1. The timer 13 is an inside timer of the CPU core 2. The clock generator 14 generates clock to the registers and so forth in the data bus 6 based on the master clock 4.

Said microcode controller 9 reads out microcode and No. 1 ope-code in an instruction that is stored in the program memory 7 (refer to FIG. 9), and the micro controller 5 reads out codes except the microcode in the instruction, that is stored in the program memory 7. Then, each of the micro controller 5 and microcode controller 9 controls various kinds of registers and multiplexers in the data bus 6 based on information that each of them has read out. Thus, the micro controller 5 and microcode controller 9 compose a controller of the entire data path.

Next, the structure of the data bus 6 is explained. The data bus 6 comprises an arithmetic logic unit (hereinafter simply referred to as ALU), a program counter (hereinafter simply PC) 22, an IRF (Instruction Register for Fetch) 23, an IRE (Instruction Register for Execute) 24, an X-REG (X register) 25, a Y-REG (Y register) 26 and a stack pointer (hereinafter simply SP) 27 as address pointer registers used for indicating the address of the data memory 8 and the like, an A-REG (A register) 28 and a B-REG (B register) 29 as general-purpose registers, a P-MUX (Program Counter Multiplexer) 30 as a mutiplexer for the address of the program memory 7, an SA-MUX (Sram Address Multiplexer) 31 as a multiplexer for the address of the data memory 8, a DATA-MUX (Data Multiplexer) 32 as a multiplexer for inputting and outputting data in and from the data memory 8, a REG-MUX (Register Multiplexer) 33 as a multiplexer for inputting and outputting data in and from the general-purpose register, an F-MUX (Fifo Multiplexer) 34 as a multiplexer for inputting and outputting data in and from a FIFO (First-In First-Out) 18 which is created outside the CPU core 2 by a user, and an IP-MUX (IP Multiplexer) 35 as a multiplexer for inputting and outputting in and from the IPs 3.

The CPU core 2 includes a well-contrived wiring route specialized for the FPGA 1 because, as compared with the ASIC or a gate array, in an FPGA or PLD (Programmable Logic Device), the system performance is significantly influenced by its own inside wiring delay characteristics, and this aspect should be considered for constructing the CPU core 2 on the FPGA 1. Hereinafter, the explanation is given to contrivance about the wiring routes around general-purpose registers on the CPU core 2, and the data memory 8.

Figure 2:
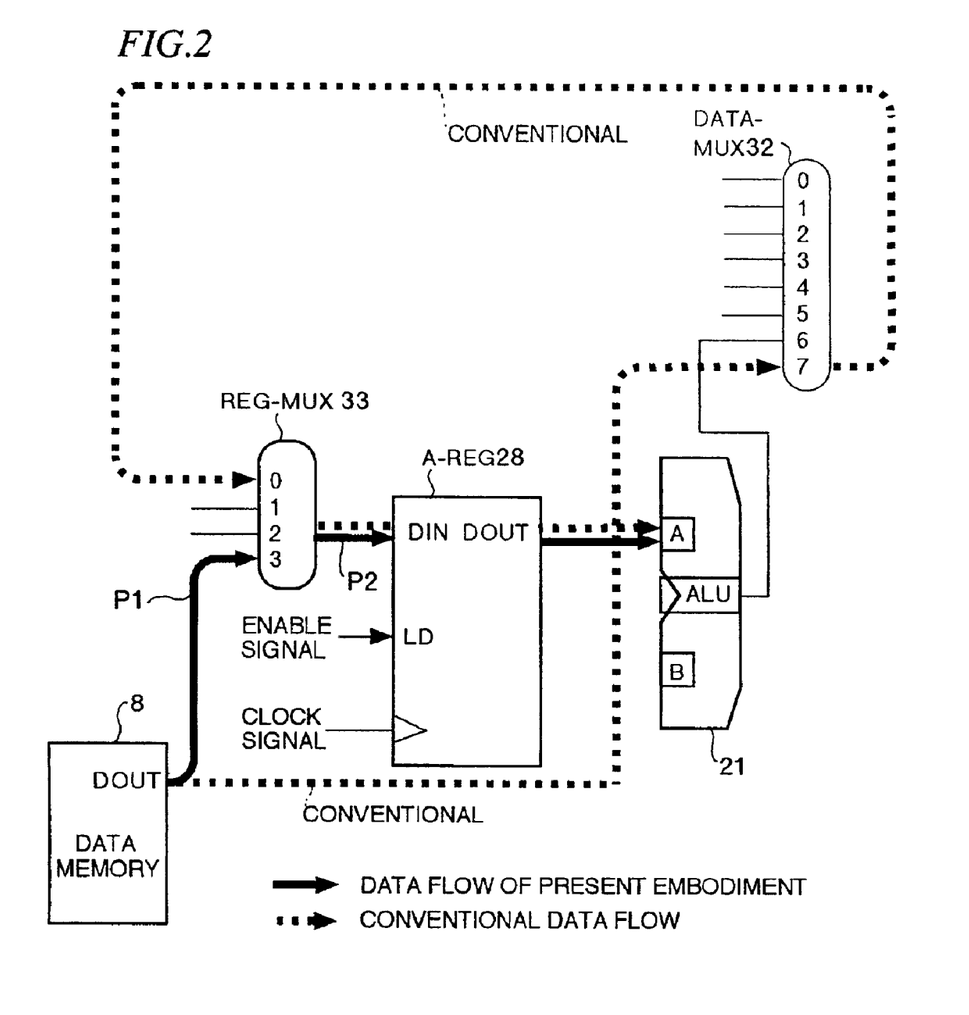
FIG. 2 is an explanatory view of a wiring route for loading data from a data memory to general-purpose registers in said CPU core.

First of all, referring to FIG. 2, contrivance about the wiring route for loading data from the data memory 8 to the A-REG 28 as a general-purpose register is explained. The wiring route (structured by wiring P1 and P2) for loading the data from the data memory 8 to the A-REG 28, connects the data memory 8 with the A-REG 28 only through a REG-MUX 33 as the multiplexer for the general-purpose registers. Concerning the CPU core such as a conventional ASIC, the wiring route for loading the data from the data memory to a general-purpose register (corresponding to the A-REG 28) has connected the data memory with the general-purpose register through a multiplexer (corresponding to the DATA-MUX 32) for inputting and outputting data of the data memory and through a multiplexer (corresponding to the REG-MUX 33) for the general-purpose register. However, in the case of constructing the CPU core 2 on the FPGA 1, if the output data from the data memory 8 passed through two multiplexers (DATA-MUX 32 as the multiplexer for the data memory 8, and REG-MUX 33 as the multiplexer for the general-purpose register), time of wiring delay would be prolonged. Accordingly, in high-speed processing, data from the data memory 8 is output to a DIN terminal of the A-REG 28 behind timing (determined by an enable signal output from the microcode controller 9 to an LD terminal of the A-REG 28, and a clock signal from clock generator 14 to the A-REG 28) of reading the data from the data memory 8 into the A-REG 28. Consequently, as mentioned above, the wiring route is provided so as to connect the data memory 8 with the A-REG 28 only through the REG-MUX 33 as the multiplexer for the general-purpose register without passing through the DATA-MUX 32 as the multiplexer for the data memory, to read data from the data memory 8 in the A-REG 28 through said wiring route, thereby shortening the time of wiring delay. This makes it possible to speed up the operation of reading data (load processing) from the data memory 8 to the A-REG 28 since data from the data memory 8 is output to DIN terminal of the A-REG 28 in time to the timing for reading data from the data memory 8 into the A-REG 28 even in the high-speed processing. While the above explanation shows the case of employing the A-REG 28 as the general-purpose register, this is also applied to the case of employing the B-REG 29 as the general-purpose register.

Figure 3:
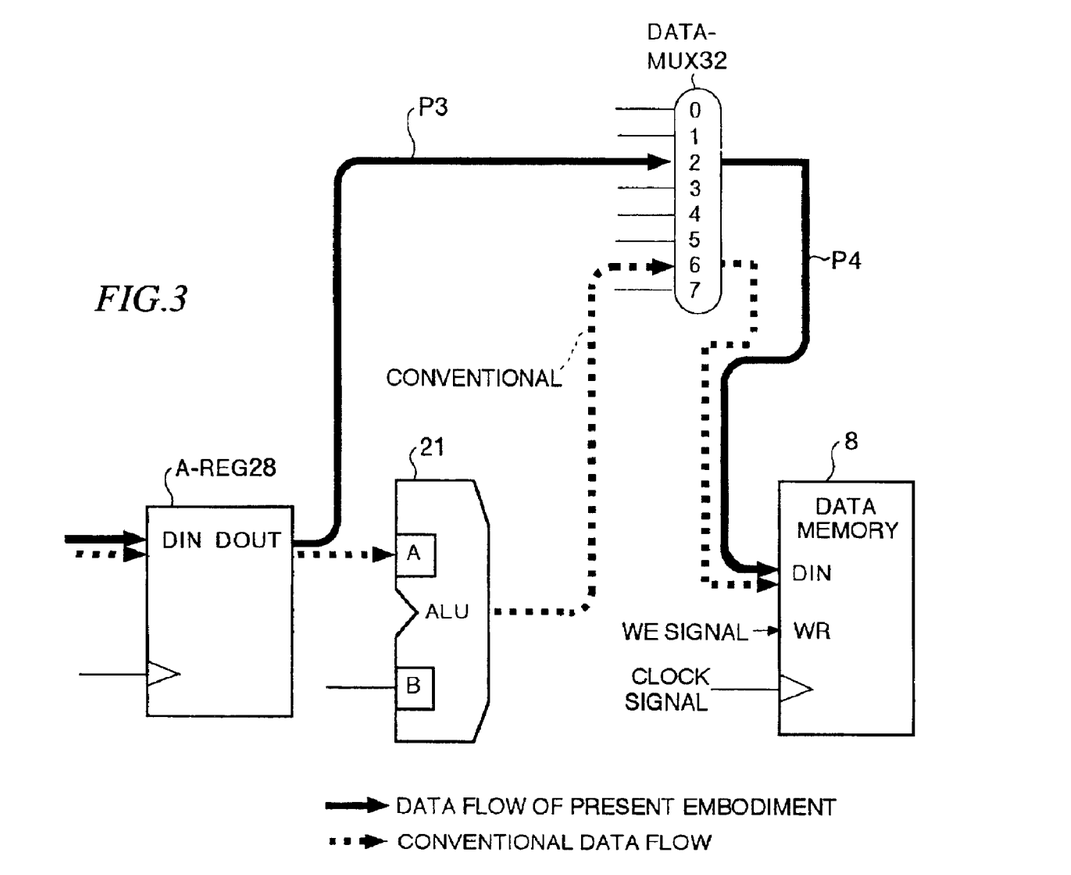
FIG. 3 is an explanatory view of a wiring route for storing data from general-purpose registers to a data memory in said CPU core.

Next, referring to FIG. 3, contrivance about a wiring route for storing data from the A-REG 28 as the general-purpose register into the data memory 8 is explained. The wiring routes (constructed by wiring P3 and P4) for storing data from the A-REG 28 to the data memory 8 connects the A-REG 28 with the data memory 8 only through DATA-MUX 32 as a multiplexer for the data memory. In the CPU core of the conventional ASIC and the like, the wiring route for storing data from a general-purpose register (corresponding to the A-REG 28) to a data memory has usually connected the general-purpose register with the data memory through the ALU and the multiplexer (corresponding to the DATA-MUX 32) for the data memory. However, in the case of constructing the CPU core 2 on the FPGA 1, if data output from the general-purpose register (A-REG 28) passed through an ALU 21, the time of wiring delay would be prolonged. Accordingly, in the high-speed processing, data output from the A-REG 28 is output to a DIN terminal of the data memory 8 behind a timing (determined by an WE (Write Enable) signal output from the microcode controller 9 to a WR terminal of the data memory 8, and a clock signal transmitted from the clock generator 14 to the data memory 8) of writing the data into the data memory 8. Consequently, as mentioned above, the wiring route is provided so as to connect the A-REG 28 with the data memory 8 only through the DATA-MUX 32 without passing through the ALU 21, and to write data from the A-REG 28 in the data memory 8 through said wiring route, thereby shortening the time of wiring delay. This makes it possible to speed up the writing operation (store processing) of data from the A-REG 28 in the data memory 8 since data from the A-REG 28 is output to a DIN terminal of the data memory 8 in time to the timing for writing data from the A-REG 28 into the data memory 8 even in the high-speed processing. While the above explanation shows the case of employing the A-REG 28 as the general-purpose register, this is also applied to the case of employing the B-REG 29 as the general-purpose register.

Figure 4:
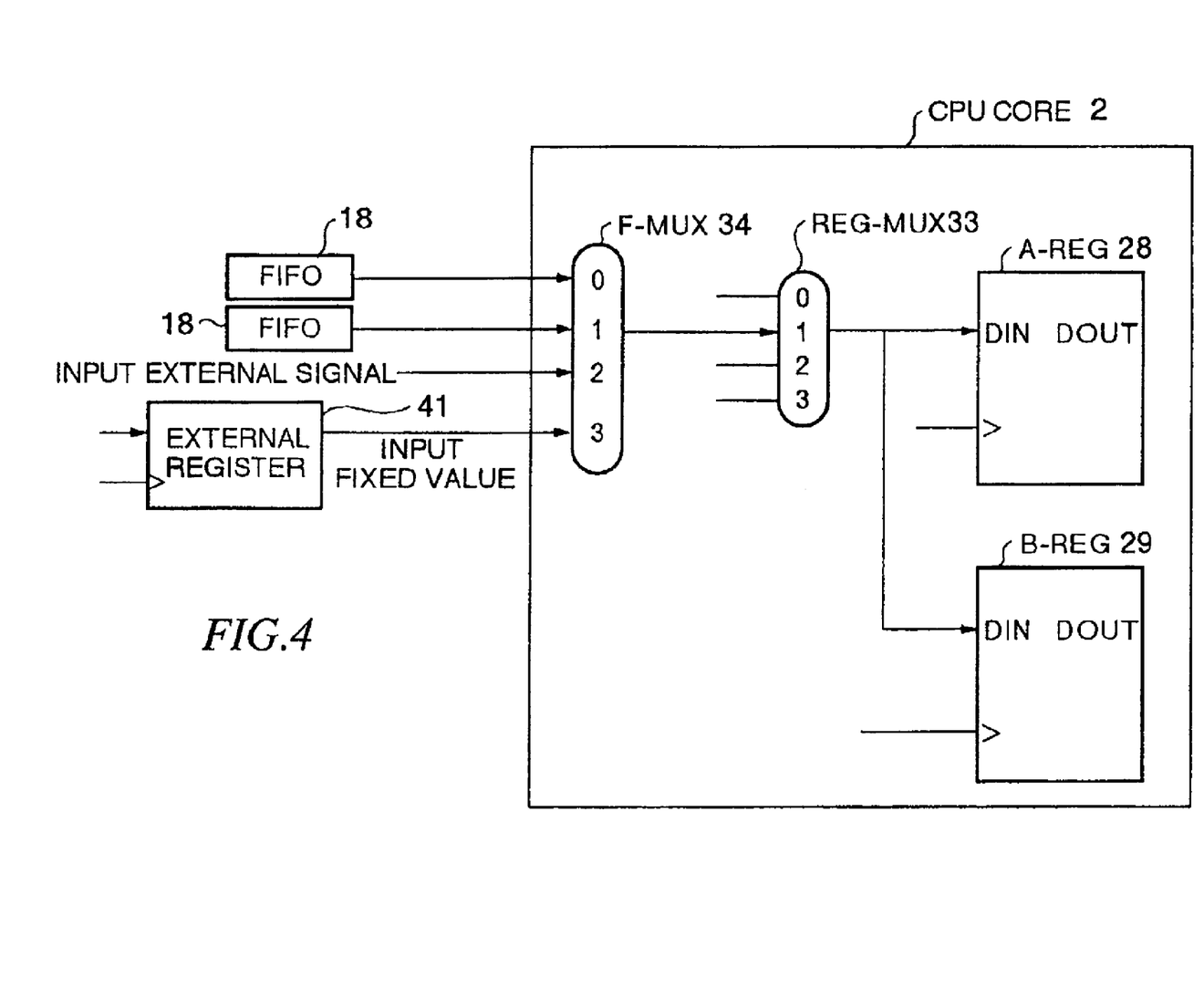
FIG. 4 is an explanatory view of a mechanism for performing a data input instruction from FIFO in said CPU core.

The CPU core 2 adopts a mechanism for performing instructions that are convenient for transferring data such as a data input instruction from FIFO or a post-increment instruction. First, referring to FIG. 4, the mechanism for performing the data input instruction from FIFO is explained. As mentioned above, the CPU core 2 has the F-MUX 34 as a multiplexer for inputting data to the external FIFO 18. Said F-MUX 34 includes a FIFO interface being integrated therein. Also, the CPU core 2 can transmit a control signal for reading out to the FIFO 18. The CPU core 2 transmits the control signal for reading out to the FIFO 18 when performing a FIFO instruction, and reads the data from the FIFO 18 into the A-REG 28 and B-REG 29 as general-purpose registers by using a FIFO interface integrated in the F-MUX 34. Input ports 0–3 can be used for inputting external signals or fixed values from external register 41 as well as for reading data from the FIFO 18. Consequently, the CPU core 2 can monitor external signals by carrying out FIFO instructions.

Figure 5:
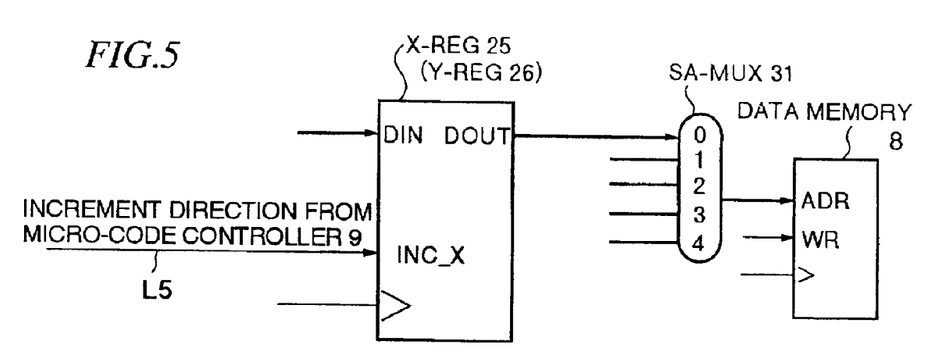
FIG. 5 is an explanatory view of a mechanism for performing a post-increment instruction in said CPU core.

Then, referring to FIG. 5, the mechanism for performing the post-increment instruction is explained. As explained above, the CPU core 2 has the X-REG 25 as the address pointer register used for indicating the address of the data memory 8 and the like. Said X-REG 25 is connected to a control line L5 for receiving the increment direction from the microcode controller 9. Further, the X-REG 25 also has a circuit for counting up the value of the address maintained inside thereof when a signal of the increment direction is input through said control line L5. The microcode controller 9 reads the post increment instruction in the program memory 7, then transmits ON-information (increment direction signal) about the bit for the increment direction of the microcode in the instruction through the control line L5 to the X-REG 25. Receiving the ON-information about the bit for the increment direction, the X-REG 25 adds 1 to the value of the address maintained inside thereof. The value of the address maintained inside the X-REG 25 is output through the SA-MUX 31 as a multiplexer for inputting the address of the data memory 8 to an ADR terminal as a terminal for inputting the address of the data memory 8. Consequently, owing to repeated uses of the post-increment instruction, the value of the X-REG 25 can sequentially be counted up as to correspond with the address of the data memory 8. This allows effective processing of data in sequential addresses on the data memory 8.

Figure 6:
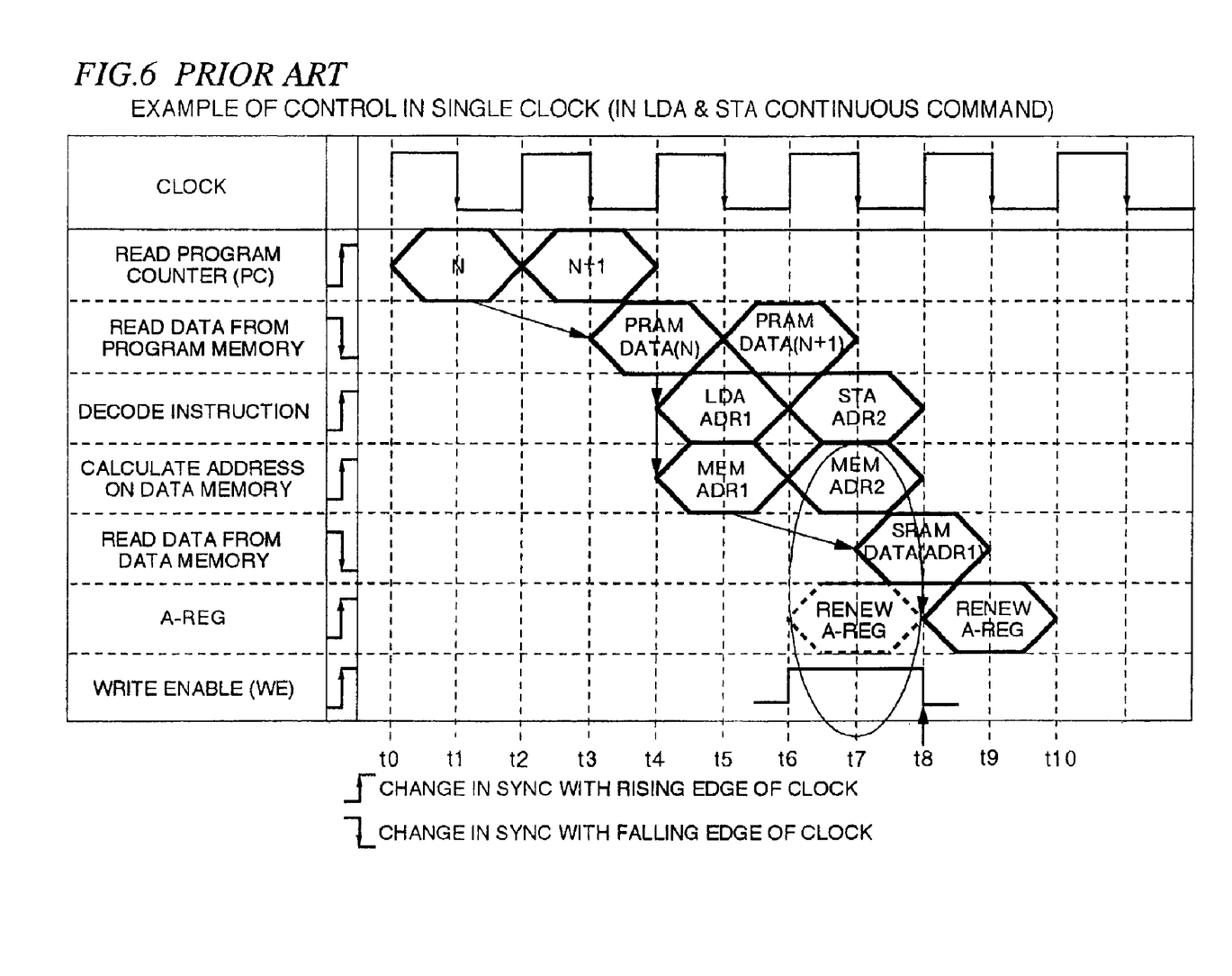
FIG. 6 is a view explaining a problem in a pipeline control in the case of sequentially performing a load instruction and a store instruction in a CPU core in which complete synchronous memories are adopted in a conventional three-stage pipeline construction.
Figure 7:
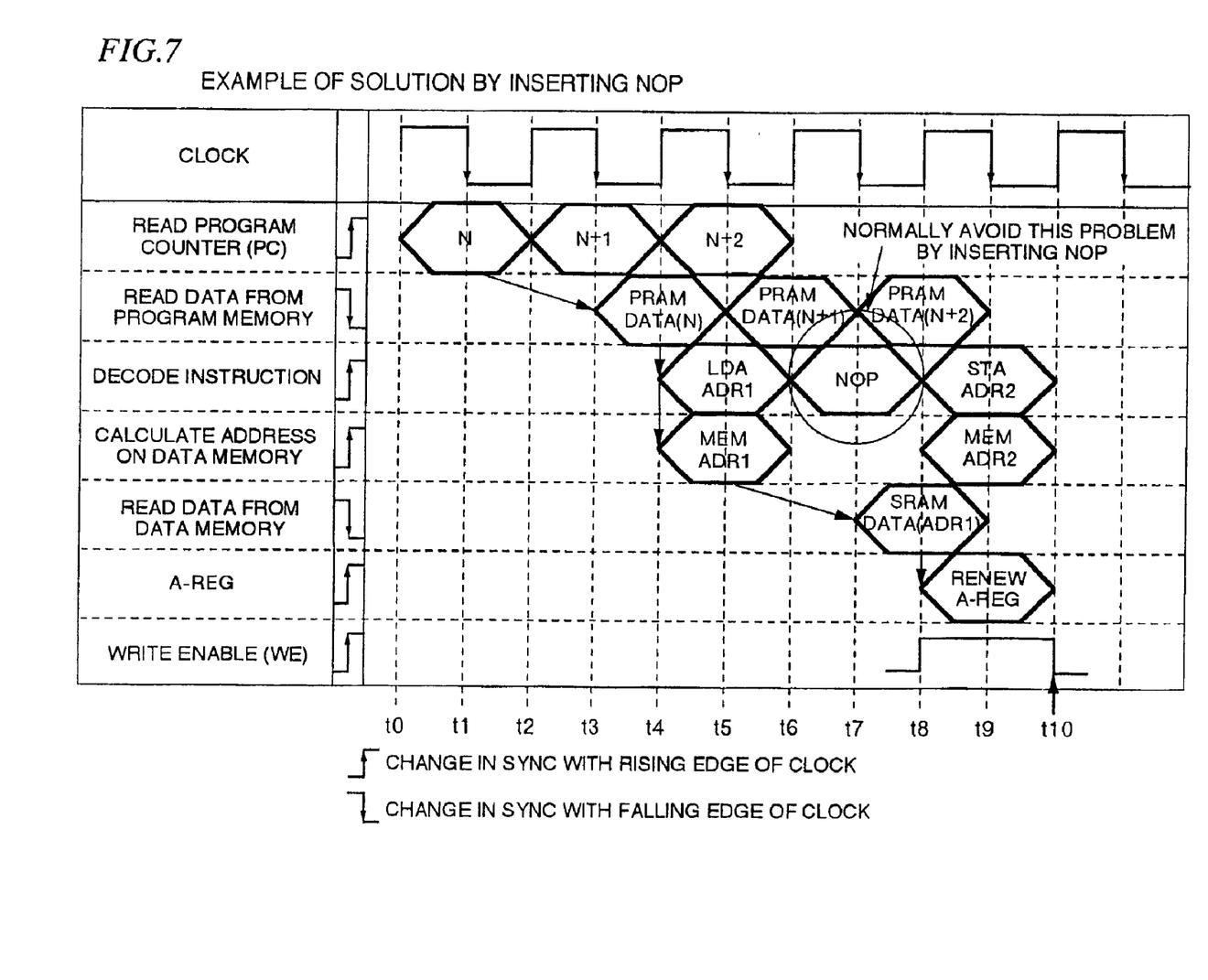
FIG. 7 is an explanatory view showing the pipeline control in which the problem in the pipeline control shown in FIG. 6 is resolved by inserting NOP between the load instruction and store instruction.
Figure 8:
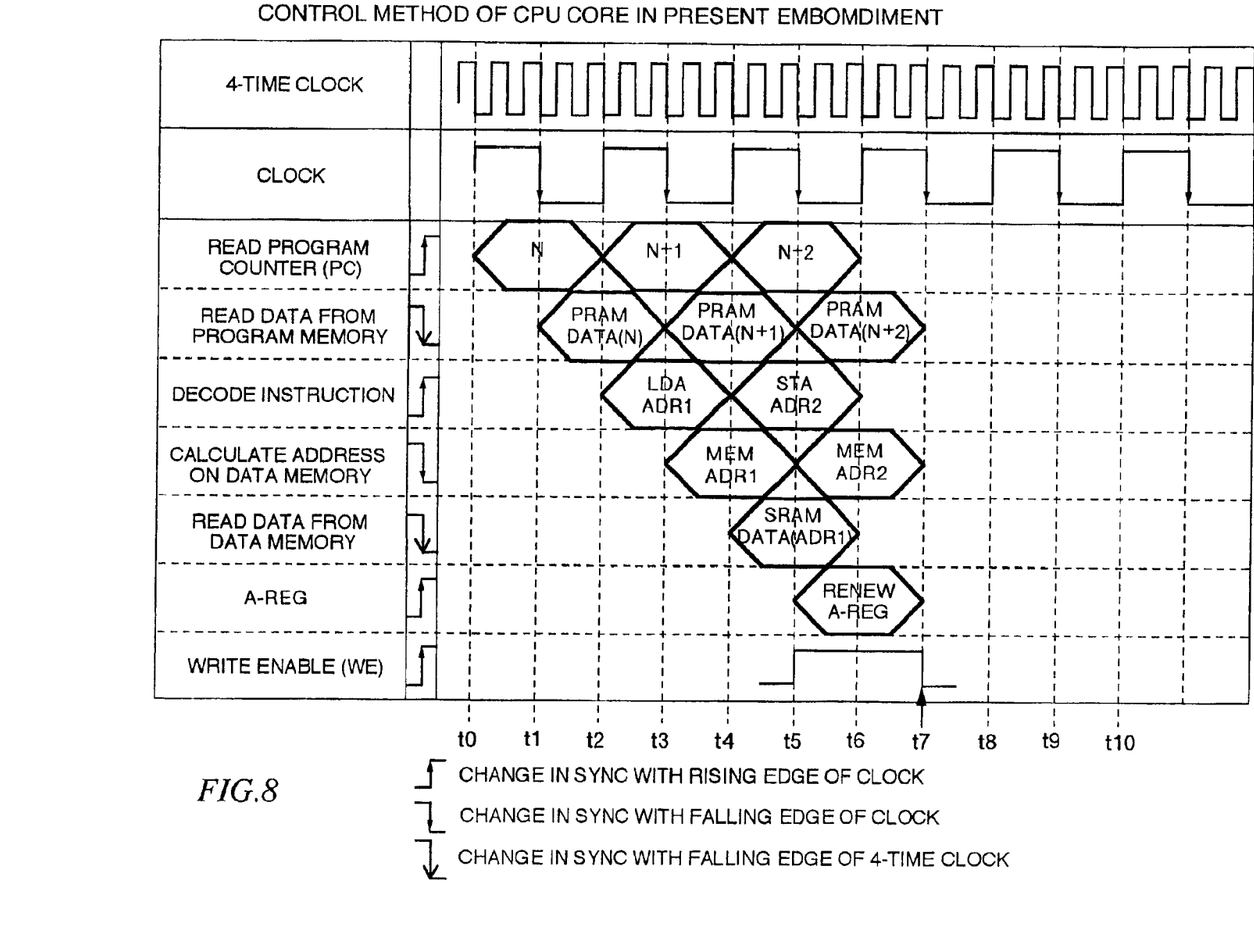
FIG. 8 is an explanatory view showing the pipeline control in which the problem in the pipeline control shown in FIG. 6 is resolved by employing a four-time clock in addition to a normal clock.

Next, with reference to FIGS. 6–8, the explanation is given to the contrivance for speeding up the processing in the case of accessing a completely synchronous memory on three-stage pipeline construction, which is applied to the CPU core 2. As shown in the above-described FIG. 1, the CPU core 2 has the program memory 7 for storing programs, and the data memory 8 for memorizing data, which are isolated with each other. Both of these memories 7 and 8 are completely synchronous memories. In asynchronous memories, the problem of signal delay becomes serious according to scale-up and speed-up of the circuit, that is, the time for outputting data from the memory after specifying the address to the memory is different depending on the circuit constitution of the memory. Consequently, it is desired that both of the program memory 7 and the data memory 8 be complete synchronous memories. However, if the program memory 7 and the data memory 8 were complete synchronous memories on the three-stage pipeline construction, the following problem would occur in the case of accessing these memories in a single clock. For example, as shown in FIG. 6, when an instruction (LDA instruction) for loading data about an ADR 1 address on the data memory 8 to the A-REG 28 of FIG. 1 and an instruction (STA instruction) for storing data of A-REG 28 read out by said loading instruction to an ADR 2 address on the data memory 8 are sequentially carried out, data from the program memory 7 and data from the data memory 8 can be read only in a falling edge of a clock, so that the A-REG 28 by the load instruction is renewed behind the timing of writing the data of the A-REG 28 into the data memory 8 by the store instruction. That is, the controller 20 in FIG. 1 outputs WE (Write Enable) signal as a signal of permitting to write data into the data memory 8 in the timing of decoding the STA instruction, and writes the data of the A-REG 28 into the data memory 8 in the timing (indicated by an arrow t8 in the figure) of a rising edge of a clock during WE signal outputting. However, at this stage, the contents of the A-REG 28 are not renewed to the data of the ADR 1 address on the data memory 8. Consequently, data of the A-REG 28 is written in the ADR 2 address in the data memory 8 before performing the load instruction.

In order to resolve the above problem, as shown in FIG. 7, if NOP (No Operation) is inserted between the above load instruction (LDA instruction) and store instruction (STA instruction), renewal of the A-REG 28 in FIG. 1 is renewed by the load instruction in time for the timing (indicated by arrow t10 in the figure) of writing data of the A-REG 28 into the data memory 8 by the store instruction. However, such an insertion of NOP reduces the processing speed of the CPU core 2.

For the above-mentioned reason, the controller 20 of the CPU core 2 according to the preset embodiment employs a 4-time clock in addition to the normal clock in order to access the program memory 7 and the data memory 8. That is, as shown in FIG. 8, the controller 20 uses the 4-time clock for reading data from the program memory 7 or data memory 8, and uses the single clock for writing data in the A-REG 28 or data memory 8. Also, it adopts a method of delaying the address calculating processing on the data memory 8 later than the instruction decoding processing by a half clock. Due to this method, the A-REG 28 is renewed by the load instruction in time for the timing (indicated by an arrow t7 in the figure) of writing data of the A-REG 28 into the data memory 8 by the store instruction, thereby making it possible to speed up the processing of the CPU core 2.

Figure 9:
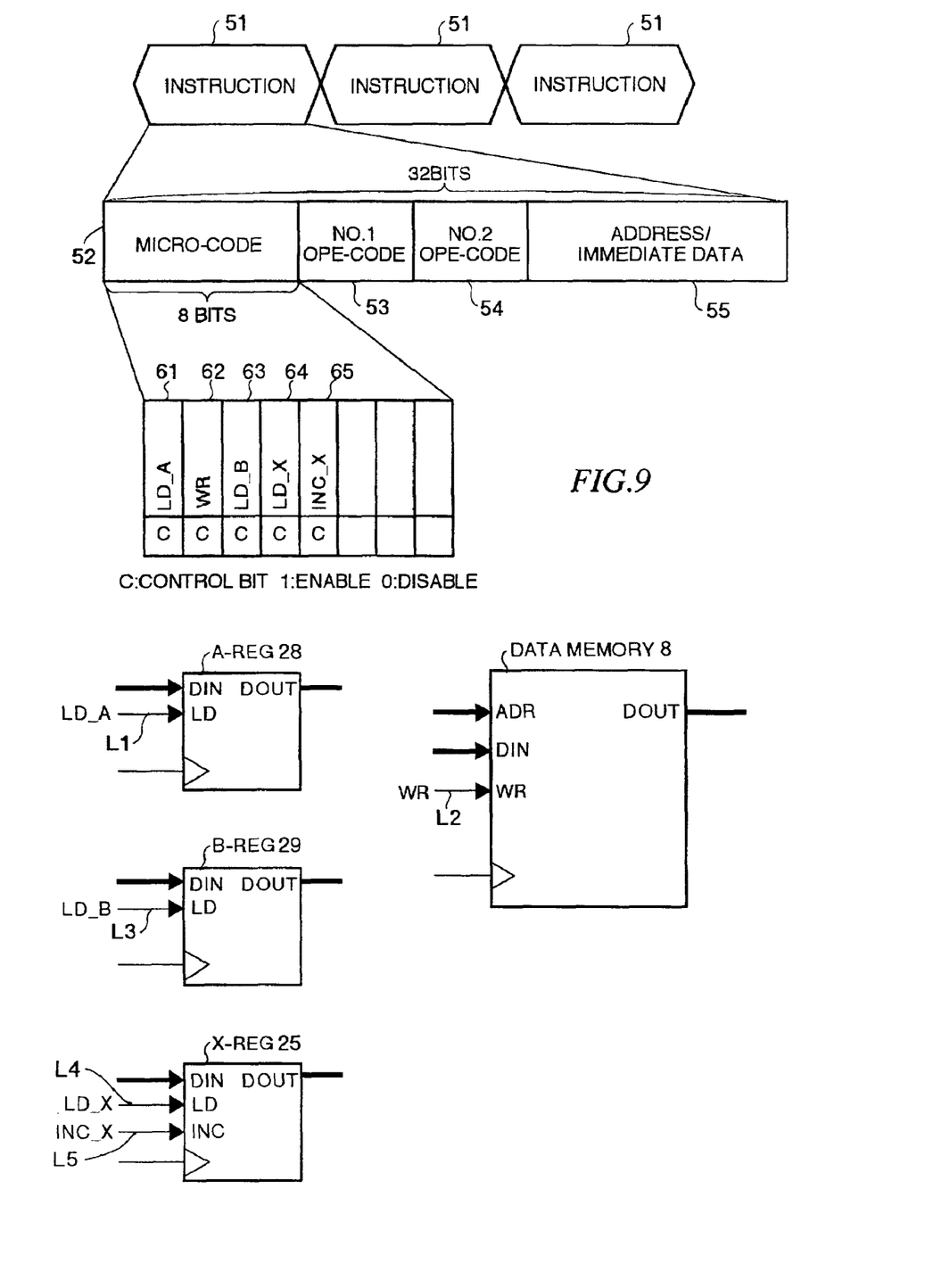
FIG. 9 is a view explaining a simplification of a structure of a controller in said CPU core.

Next, referring to FIG. 9, the explanation is given to a contrivance for simplifying the composition of the micro controller 5 adopted in the CPU core 2. An instruction 51 employed in said CPU core 2 includes micro code 52, No.1 ope-code 53, No.2 ope-code 54 and address/immediate data 55. Length of the instruction 51 is 32 bits wherein leading 8 bits are allocated in the micro code 52. Among each of bits in the micro-code 52, leading 5 bits 61–65 are control bits C used for controlling the register in the data bus 6, or the data memory 8. While each of the bits 61–64 in the microcode 52 are bits for controlling write-in, respectively corresponding to the A-REG 28, the data memory 8, the B-REG 29 and X-REG 25, the control bit 65 is a bit for the increment direction to X-REG 25. The micro-code controller 9 described in FIG. 1 has control lines L1–L4 for outputting enable signals between LD terminals of the A-REG 28, B-REG 29 and X-REG 25, and WR terminals of the data memory 8, and has the control line L5 for outputting an increment-direction signal to an INC terminal of the X-REG 25. When reading the micro code 52 in the instruction 51, micro-code controller 9 transmits an enable signal for permitting to write in the registers 25, 28 and 29, and the data memory 8 respectively corresponding to the control bits 61–64 through the respective control lines L1–L4 if the control bits 61–64 in the micro-code 52 are 1 (ON); but it does not transmit the enable signal if the control bits 61–64 are 0 (OFF). Also, the micro-code controller 9 outputs an increment direction signal to the X-REG 25 through the control line L5, if the control bit 65 is 1 (ON); but it does not transmit an enable signal if the control bit 65 is 0 (OFF). This makes it possible to control the registers 25, 28 and 29, and the data memory 8 with using ON/OFF information for the control bits 61–65 in the micro-code 52, which allows to easily execute some of control for various kinds of registers or memories without decoding the instruction, which has conventionally been executed by the micro controller after decoding the instruction. Accordingly, control processing for primary registers or memories can be eliminated from the control processing which is performed by the micro controller 5, which simplifies the composition of the micro controller 5, thereby simplifying the entire composition of the controller 20 shown in FIG. 1.

Being different from a CPU core on the system LSI which is integrated in a conventional ASIC and the like, the above CPU core 2 has an architecture which can be customized according to a specification of the IP which composes the system LSI, and besides, can be tested according to the modified contents thereof. The customization and test of the CPU core 2 are carried out by using a personal computer. That is, prior to customization of the CPU core 2, a source as circuit information for composing the CPU core 2, and a tool for customizing and testing the CPU core 2 are installed from a CD-ROM 73 (computer-readable recording medium in claims) shown in FIG. 11 to a personal computer 71, and then the CPU core 2 is customized and tested by using said tool.

Figure 10:
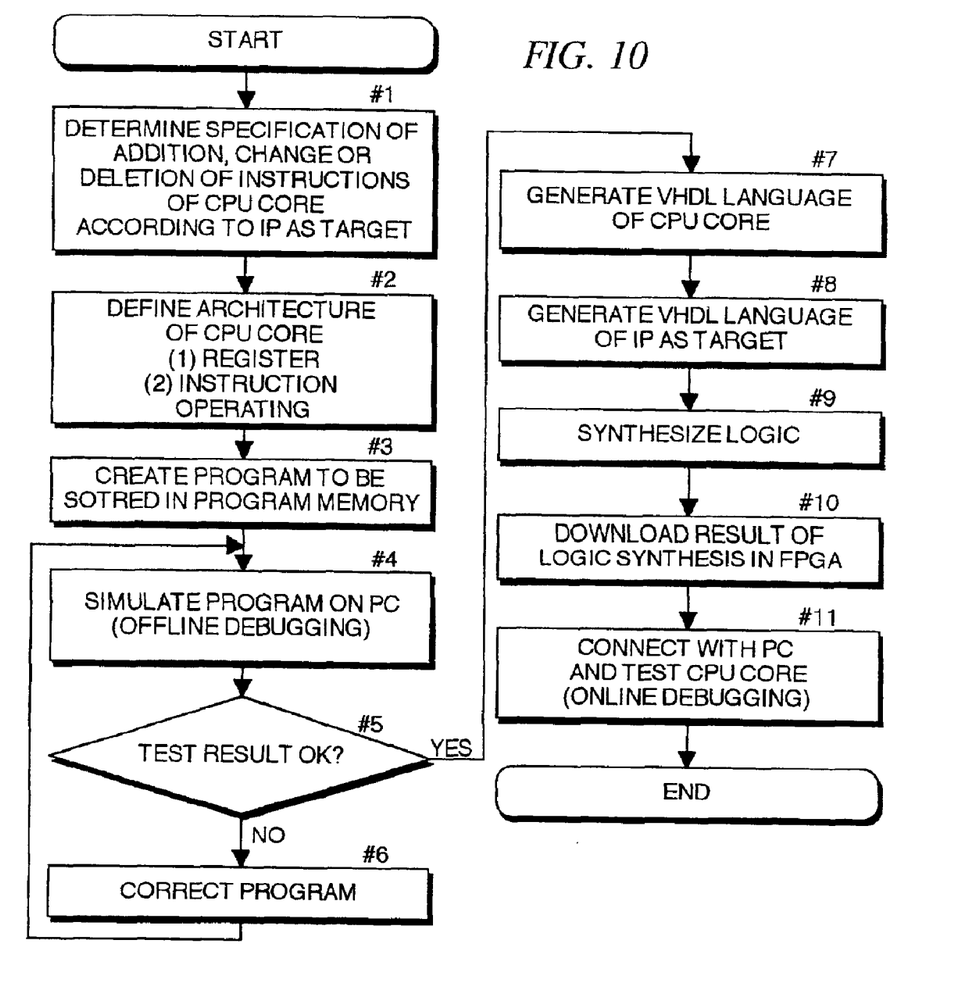
FIG. 10 is a flowchart showing processing of customization and debugging of said CPU core.
Figure 12:
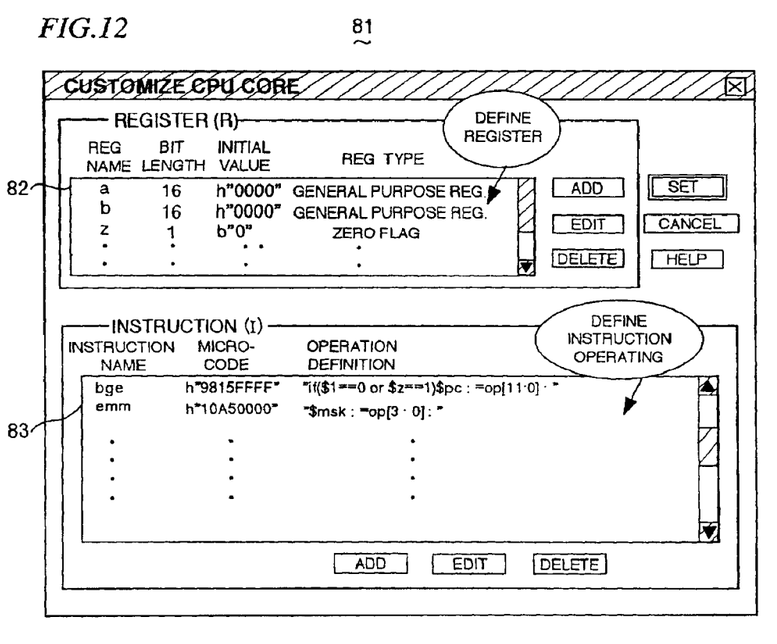
FIG. 12 is a view showing a screen for customizing said CPU core.

FIG. 10 shows a flow of customizing processing of the CPU core 2 and examining processing after the customization of the CPU core 2. The user determines specifications of addition, change or deletion of the instructions of the CPU core 2 according to the IP 3 as a target (#1), and defines the architecture of the CPU core 2 from a customizing screen 81 shown in FIG. 12 in response to the specification (#2). Concretely, the user adds, changes or deletes various kinds of registers in the CPU core 2 from a register-definition window 82 on the customizing screen 81, and also, adds, changes or deletes various kinds of instructions in the CPU core 2 by using simplified language from an instruction-definition window 83. Then, the user creates a program to store in the program memory 7 (#3), and simulates said program on a personal computer 71 (offline debugging) (#4). Unless an examined result by said simulation is OK (NO in #5), the user repeatedly corrects (#6) and simulates (#4) until the examined result becomes OK (YES in #5). When a result of the examination is OK (YES in #5), the user generates a source at VHDL (VHSIC Hardware Description Language) level of the CPU core 2 according to the contents of the CPU core 2 defined in #2 (#7), and generates a source at VHDL level of the IP 3 as a target (#8). After that, the user synthesizes logic of these sources (#9), and downloads the result of said logic synthesis into the FPGA 1 (#10). Then, connecting the FPGA 1 in which the result of the logic synthesis has been downloaded, with the personal computer 71, the user carries out an actual CPU core 2 test on the FPGA 1 (#11).

Figure 11:
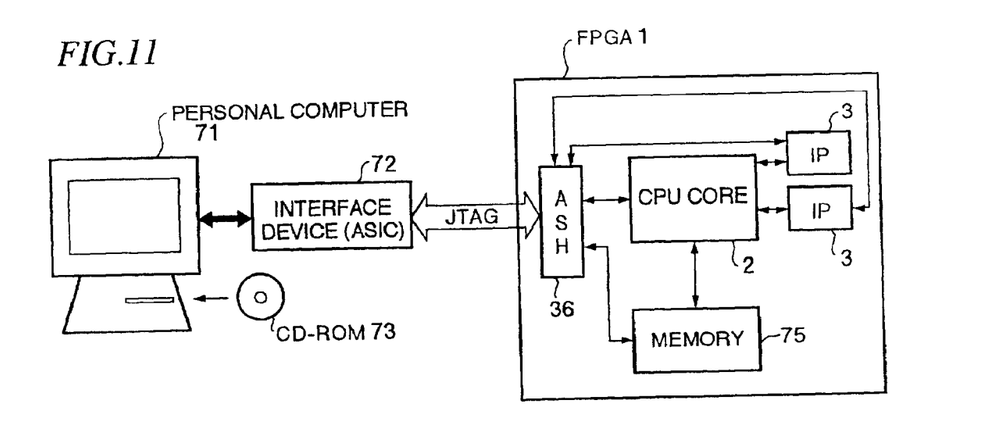
FIG. 11 is a structural view explaining a downloading operation of a logic synthesis result to said FPGA, and an actual CPU core test.

Next, referring to FIG. 11, the explanation is given to a downloading operation of the result of logic synthesis, and the actual CPU core 2 test after downloading. The personal computer 71 is connected with the FPGA 1 through an interface device (ASAP: Adaptive Scan Agent Pod) 72. The personal computer 71 downloads the logic synthesis result to the FPGA 1, or carries out the actual CPU core 2 test on the FPGA 1 through a special-purpose terminal for a boundary scan test, which is equipped in said ASAP 72, and called as TAP (test access port). The FPGA 1 has the ASH 36 as a module for debugging a user-created logic circuit such as the IP 3, the CPU core 2. The user reads and writes data from and in the CPU core 2 on the FPGA 1, or the registers or memories of the IP 3 through the ASAP 72 and ASH 36 from the personal computer 71, thereby carrying out the actual device test for the CPU core 2 or IP 3. While data transmission between the personal computer 71 and ASAP 72 is executed by the RS-232C interface, data transmission between the ASAP 72 and ASH 36 is executed by a JTAG interface for a boundary scan test.

As described above, the present embodiment discloses the FPGA 1, wherein, as previously explained in FIG. 9, the instruction of the CPU core 2 includes the micro code 52, and the micro-code controller 9 transmits ON/OFF information for each of bits composing the micro code to the registers 25 and 28 or the data memory 8 allocated in each of the bits through control lines after reading the instruction, to thereby control them. This constitution simplifies the procedure executed by the micro controller 5. Besides, this constitution makes it possible to delete, change and add registers or instructions in the CPU core 2 from the customizing screen 81 described in FIG. 12, thereby simplifying the composition or processing of the micro controller 5 by deleting unwanted registers or instructions, or adding convenient instructions. This allows to construct the simplified CPU core 2 on the FPGA 1, so that, as compared with the case in which the CPU core used in the conventional ASIC is directly integrated in the FPGA 1, a space for the CPU core 2 can be decreased on the FPGA 1.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, the micro-code controller 9 is provided separately from the micro controller 5 in the above embodiment, but functions of the micro-code controller 9 can be integrated in the micro controller 5 in order to unitedly construct them. Further, the above embodiment employs a 4-time clock in addition to the normal clock for increasing processing speed of the CPU core 2, but combination of the clocks are not limited to them.

What is claimed is:

1. A re-programmable logic integrated circuit comprising:
   a CPU core provided with registers, memories and a controller for the registers and memories;
   wherein the CPU core having instructions including microcode; and
   wherein the controller having control lines for outputting enable signal to the registers and memories, the controller reading reads in an instruction of the instructions, and transmitting ON/OFF information for each of bits composing the microcode included in the instruction to ones of the registers and memories allocated to each of the bits, thereby controlling the registers and memories through the directing control lines
   wherein the CPU core has address pointer registers used in accessing the memories;
   wherein the controller has directing control lines for giving either direction of increment and decrement to the address pointer registers, reads in the instructions, and transmits ON/OF information for each of bits for giving either direction of increment and decrement to the address pointer resisters in microcode included in the instruction through the directing control lines; and
   wherein the address pointer resisters counts up or counts down values or maintaining addresses when receiving ON information about the bits for giving either direction of increment and decrement from the controller through the directing control lines.

2. The logic integrated circuit according to claim 1, wherein the CPU core is further provided with general-purpose registers, and a data transmitting path for connecting the general-purpose registers and memories only through multiplexers for inputting and outputting to and from the general-purpose registers without passing through multiplexers for inputting and outputting memory data, and wherein the CPU core inputs data from the memories to the general-purpose registers with using the data transmitting path.

3. The logic integrated circuit according to claim 1, wherein the CPU core is further provided with general-purpose registers, and a data transmitting path for connecting the general-purpose registers and memories only through multiplexers for inputting and outputting to and from the general-purpose registers without passing through ALU, and wherein the CPU core outputs data to the memories with using the data transmitting path.

4. The logic integrated circuit according to claim 1, wherein the CPU core comprises multiplexers including an integrated interface for inputting data from FIFO that is an accessible memory having data input and output units which are separated from each other, and wherein the CPU core has instructions for reading in data from the FIFO through the multiplexers.

5. The re-programmable logic circuit of claim 1 wherein the re-programmable logic circuit is a field programmable gate array.

6. The re-programmable logic circuit of claim 2 wherein the re-programmable logic circuit is a field programmable gate array.

7. The re-programmable logic circuit of claim 3 wherein the re-programmable logic circuit is a field programmable gate array.

8. The re-programmable logic circuit of claim 4 wherein the re-programmable logic circuit is a field programmable gate array.

9. A recording medium which is capable of being read out by computers, and records executable code including circuit information for implementing the CPU core of claim 1 in the re-programmable logic integrated circuit, the executable code being based on hardware description language level for the CPU core.

10. The recording medium of claim 9 wherein the re-programmable logic circuit is a field programmable gate array.

\* \* \* \* \*